Aug. 28, 1934.  C. H. BILLS  1,971,701
HOLE CUTTER FOR TANK FLANGE PIPE COUPLINGS
Filed June 29, 1932  3 Sheets-Sheet 1

INVENTOR
CLAUD H. BILLS
BY Hazard and Miller
ATTORNEYS

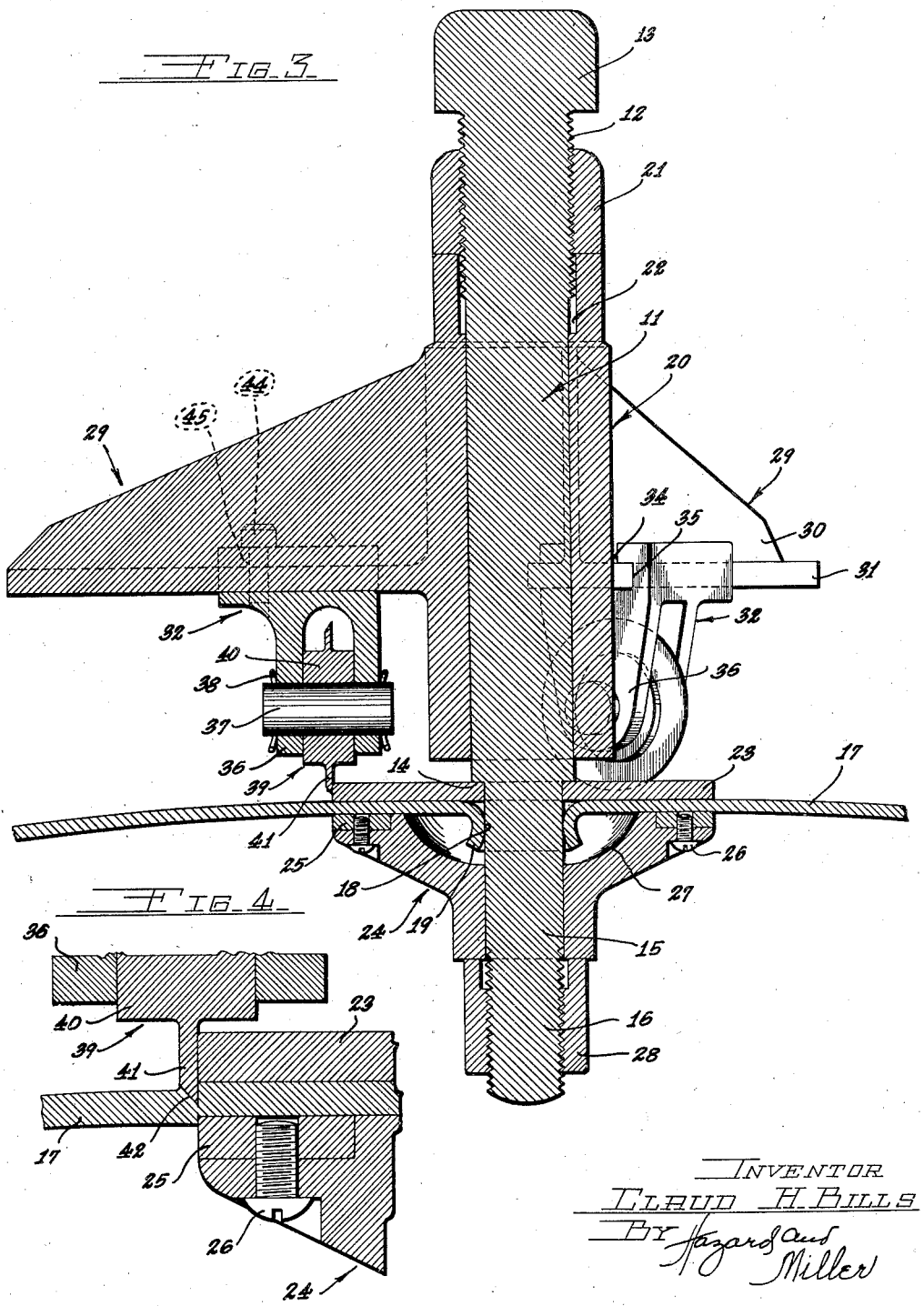

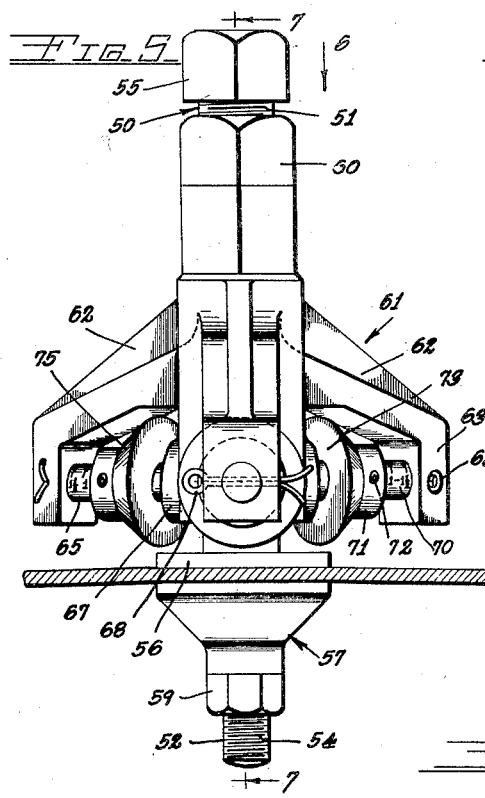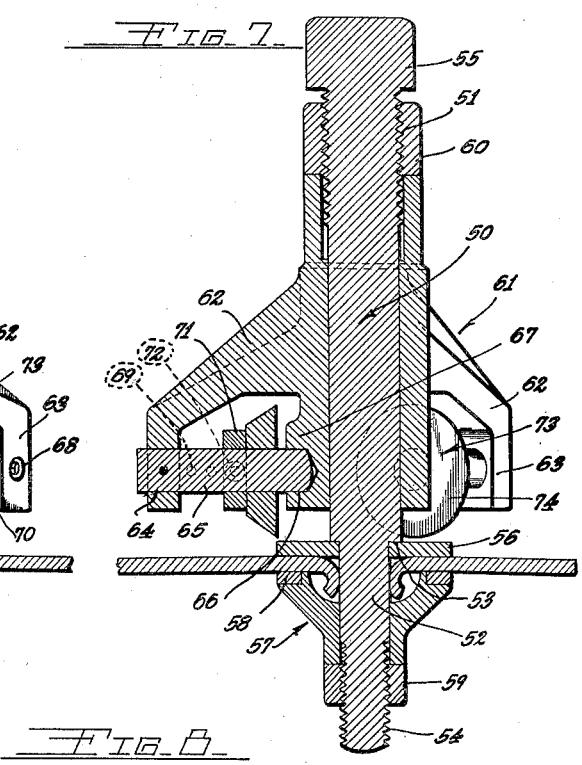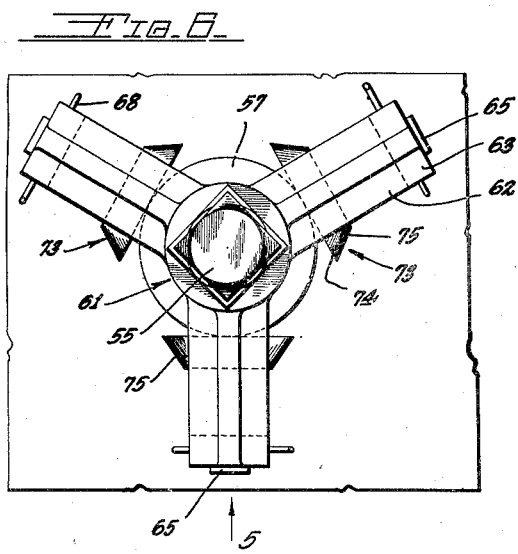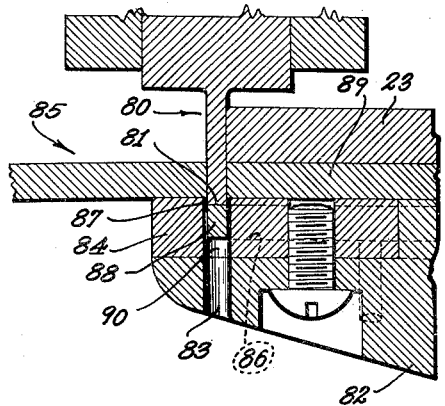

Patented Aug. 28, 1934

1,971,701

UNITED STATES PATENT OFFICE 1,971,701

HOLE CUTTER FOR TANK FLANGE PIPE COUPLINGS

Claud H. Bills, Los Angeles, Calif., assignor of one-half to Colin W. Timmons, Alhambra, Calif.

Application June 29, 1932, Serial No. 619,916

6 Claims. (Cl. 164—71)

My invention relates to a tool of a portable type which is especially designed to cut circular holes in tanks, at which holes flanged pipe couplings may be attached. A type of such coupling is illustrated in connection with my copending patent application for Flange pipe coupling for tanks, filed June 29, 1932, Serial No. 619,915.

My present invention is designed to make a circular cut in the wall of a tank or other similar structure, the cut being, preferably, made from the outside, and by drawing action exerted on the outside on the metal disk to be removed, such disk is pulled outwardly in the action of the cutting and a circular hole is formed with clean, well defined edges.

An object and feature of my present invention embodies first punching a hole in the tank at the center of the circular hole to be cut, this being done by a punch which forces the metal of the tank inwardly. By means of this punch hole, the cutting tool or implement is applied. The attachment of the cutting tool is by means of a stem somewhat in the type of a bolt having a pressure ring on the inside secured in place by a nut threaded on the inner end of the stem. On the outside a clamping ring is secured on the stem, being held by a shoulder in tight fit against the wall of the tank, the nut on the inside securely attaching the pressure ring and the clamping ring with the stem to the metal wall of the tank. When the pressure ring or shearing member is tightend on the stem it is tightened with sufficient force to flatten the disk of the plate or tank wall which is clamped between the clamping ring and pressure ring. This is of particular importance where the tank wall is curved, such as in a cylindrical tank. With this type of support for the cutters, another object and feature of my invention is making a circular cut from the outside by rotary cutters, such cutters following the contour of the clamping ring and being gradually pressed into the wall of the tank as this is cut. The pressure of cutting also exerts an outward pull on the disk or section of the tank to be removed to form a hole. I, therefore, operate somewhat by a shearing or a reverse of a punching action, in which the cutters give a circular cut on the outside of the tank wall and the pressure ring, which is preferably provided adjacent its periphery with a hard metal shearing ring, functions to shear the metal of the tank with a pressure from the inside outwardly. Thus, when the cutters have approximately cut through the wall of the tank, the disk segment with the stem, the pressure and the clamping ring, are pulled outwardly, leaving a clean hole in the tank without outwardly or inwardly pressed fins or ragged edges.

A further detailed object of my invention in regard to the manipulation of the cutters and exerting of the pressure is that such cutters are carried by a sleeve which may move longitudinally on the stem. Rotary cutters are moved around the periphery of the clamping ring and at the same time are pressed into the metal of the tank wall. This pressing action on the outside, also, as above mentioned, exerts a shearing force from the inside by the pressure ring.

My invention is illustrated in the accompanying drawings, in which:

Fig. 3 is an enlarged vertical section on the line 3—3 of Fig. 1 in the direction of the arrows.

Fig. 4 is an enlarged section showing the cutters and the shearing action.

Fig. 5 is a side elevation of a modification of my invention taken in the direction of the arrow 5 of Fig. 6, suitable for smaller holes.

Fig. 6 is a plan taken in the direction of the arrow 6 of Fig. 5.

Fig. 7 is a vertical section on the line 7—7 of Fig. 5 in the direction of the arrows.

Fig. 8 is a section showing a modified type of cutter.

Figure 1:
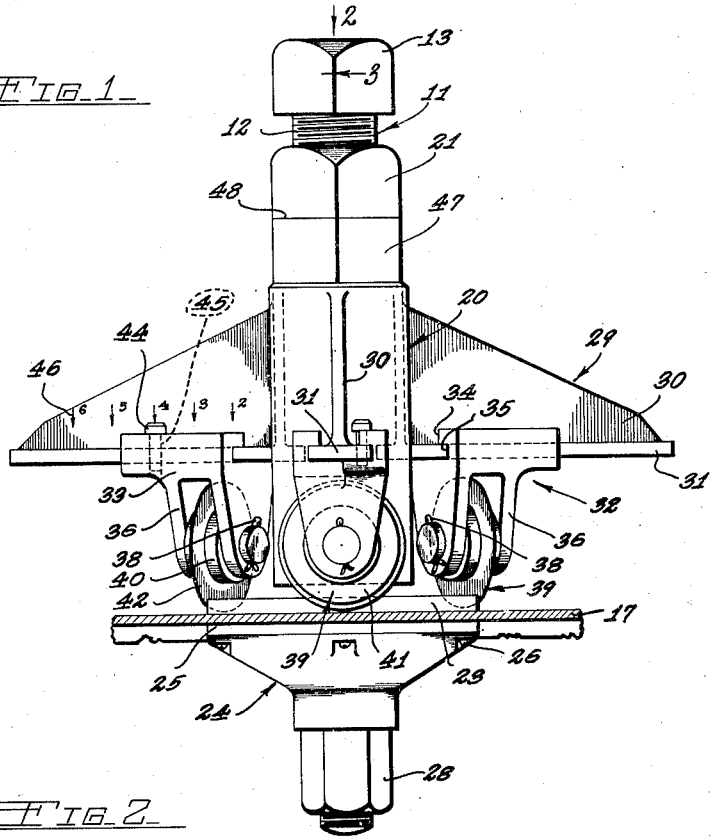
Fig. 1 is a side elevation taken in the direction of the arrow 1 of Fig. 2 of one form of my invention.
Figure 2:
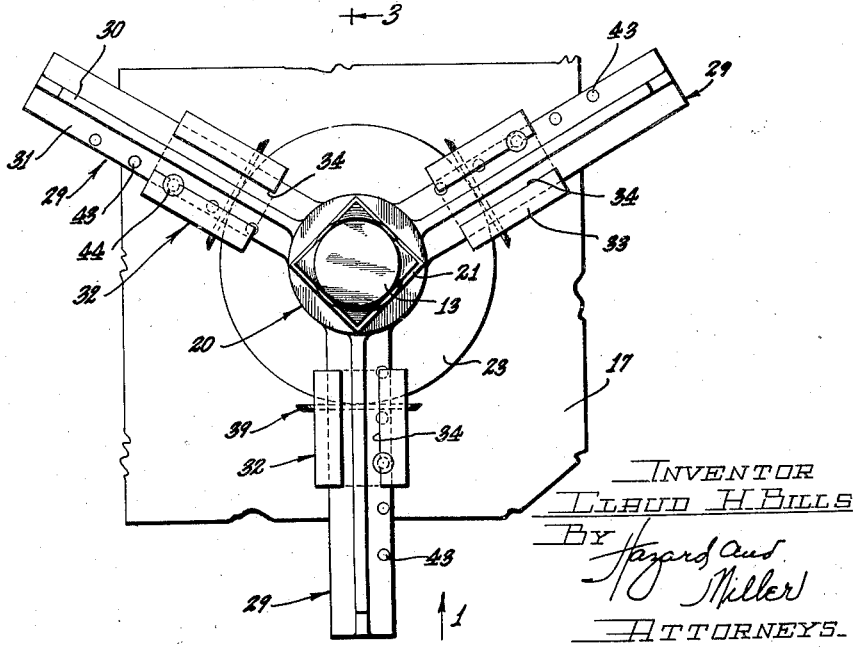
Fig. 2 is a plan taken in the direction of the arrow 2 of Fig. 1.

Referring first to the construction of Figs. 1, 2, and 3, in my construction I used a substantial, strong bolt-like stem 11. This is illustrated as having a threaded outer end section 12, the main body of the stem being the same as the roots of the threads and on the outer end there is a head 13 having wrench grip faces. The head is preferably square. The stem has a shoulder 14 and a reduced holding section 15. This section at the end has a threaded portion 16. In this case the theads are cut below the peripheral surface of the section 15.

In applying my invention a metal plate, such as a tank wall, is indicated at 17. This is curved, a slight curvature being indicated in Fig. 3. The sheet is prepared for application of the stem by forming a punch hole 18. This is made by a punch which forces a fin 19 inwardly. The punch used is of substantially the same diameter as the holding section 15 of the stem.

Before the stem is threaded through the punched hole, a sleeve 20 is fitted on the stem, the feeding nut 21 preferably being threaded on the stem first underneath the head 13. The cutters can be applied subsequently, if desired. The sleeve has an enlarged bore 22 to accommodate the threads 12 on the stem. A circular clamp plate 23 is fitted on the holding section of the stem against the shoulder 14. The holding section is then inserted through the punched hole and a clamping ring 24 is fitted on the inside. This clamping ring has a replaceable shearing ring 25 held in place by screws 26, this being inserted in a annulus. The shearing ring is reversible and may be turned upside down. A hollow space 27 is left in the pressure ring to accommodate the fins 19. A clamping nut 28 is threaded on the inside threaded section 16 of the stem to pull the shoulder of the stem tightly against the clamping plate and force the pressure ring with its shearing ring snugly against the inside of the sheet metal to be cut. This nut is clamped sufficiently tightly to support the stem in a rigid manner. As both the clamping ring and the shearing member have exactly the same diameters, or nearly so, and present flat opposed surfaces, the clamping plate and pressure ring or shearing member are capable of flattening the plate or tank wall between them if the nut is tightened sufficiently. Where the device is used to cut a hole in a curved tank wall the pressure ring or shearing member is tightened by the nut with sufficient force so as to flatten a disk of the tank wall between the pressure ring and the clamping plate, rendering it absolutely flat or nearly so. The outside diameters of the clamping ring and of the shearing ring are equal.

The sleeve 20 is illustrated as having a plurality of arms 29, there being three arms shown. Each arm has a web section 30 and a pair of horizontal oppositely directed flanges 31. The flanges are at right angles to the axis of the stem. Riding on each of the flanges of the arms there is a cutter carriage 32. This carriage has a body structure 33 having a slot 34 in the top and undercut sections 35 to ride on the flanges of the arms. These flanges thus form guides for the cutter carriages. Each of these carriages has a pair of depending ears 36 forming a journal for the cutter shafts 37, these shafts being illustrated as being held in place by cotter pins 38. The cutters 39 have a substantial hub 40 and a cutting disk or blade 41. This is provided with a beveled edge 42.

In order to adjust the cutters for cutting different sized holes, one of the flanges of each arm is provided with a series of perforations 43 in which may be inserted a removable pin 44, this pin fitting in perforations 45 in each carriage. There are gauge marks 46 preferably on the web of each arm to indicate in which hole to insert the pin to locate the cutters at the required diameter.

The manner of operation and functioning of the construction above described is as follows:

It is manifest that clamping plates 23 and clamping rings 24 must be of different diameters for different sized holes. However, on a given assembly for cutting a given hole, the clamping plate 23 and ring 24 always have exactly the same diameter or very nearly so. In practice the edges of these two parts are carefully ground so as to be of exactly the same diameter. These are of such a diameter that the inside face of the cutters has a snug fit against the clamping ring and the cutters may be pressed through the metal to substantially the edge of the shearing ring 25.

After the stem 11 is securely clamped to the plate to be cut, the sleeve 20 is adjusted to bring the cutters into contact with the metal, this being done by rotating the nut 21. This nut is turned so that such nut and the wrench grip face 47 of the upper portion of the sleeve are brought into alignment. These are preferably formed of squared faces for a squared jaw wrench. The wrench is provided with a jaw which may overlap the joint 48 between the wrench grip end 47 and the nut 21. Therefore, in turning the sleeve and, hence, rotating the cutters around the clamping disk 23, the nut 21 automatically feeds the cutters into the work. If the device is used on a tank having a curved wall, such as is present in a cylindrical tank, the cutters will not do most of their cutting or weakening of the metal at diametrically opposite sides of the clamping plate 23. This is by virtue of the fact that the pressure ring or shearing member was originally tightened with sufficient force to flatten the disk of the tank wall which immediately surrounds the stem. Consequently, the mounting of the stem 11 not only serves to rigidly secure it in place but also to flatten the plate if it is initially curved. As the plate is thus rendered absolutely flat even though initially curved all cutters will engage the edges of the disk of the flattened plate clamped between the clamping plate and pressure member equally with the result that the edges of this disk of the tank wall will be simultaneously and equally weakened. If, for any reason, the feed should be too rapid and the cutters jam, the wrench may be slipped on to the wrench grip end 47 and the sleeve and cutters rotated without rotating the metal until the nut is sufficiently cut to again allow feeding. As the cutters bear on the outside of the metal with an inward thrust, the pressure ring 24 with the shearing ring 25 exert an outward pull on the metal disk to be removed from the tank wall. The shearing ring 25 is made of hard metal and this exerts a shearing action, cutting into the metal after it is weakened by the outside cut of the rotary disk cutters somewhat in the manner illustrated in Fig. 4. This shearing action, from the inside out, causes the metal of the tank wall to shear through slightly before the cutters have worked into the metal a sufficient amount to completely meet the shearing ring. This action of the outward pull or shearing stress on the disk to be removed from the tank wall causes the section cut to be immediately pulled out with considerable force when the cutters have worked substantially through the metal. This type of shearing action on the inside combined with the rotary cutting action on the outside causes a clean-cut circular hole in the tank or other metal without objectionable fins being formed. The edges are sufficiently clean-cut that they do not require to be reamed.

After the tool has been removed, the disk cut from the metal is secured between the clamping ring and the pressure ring and in case the nut 28 is jammed tight, a wrench may be used to engage the head 13 of the stem and another wrench the nut 28. Therefore, no matter how tightly this nut may have become jammed, it can be loosened and unthreaded. The pressure ring may, therefore, be removed and the disk of metal cut from the tank wall removed from the stem.

The device may then be set for further cutting of holes.

In the construction illustrated in Figs. 5, 6, and 7, the stem is indicated as 50, having threads 51 at one end, a reduced holding section 52 at the opposite end, with a shoulder 53, and a small threaded end 54. The head of the stem is indicated at 55. The clamping ring 56 fits on the stem and an opposite pressure is brought to bear on the disk to be cut by the pressure ring 57, this having a shearing ring 58, these being clamped in position by the nut 59. A feeding nut 60 is mounted on the large threads 51 of the stem. As so far described, the construction is substantially the same as that in Figs. 1 through 4.

In this case the sleeve 61 is somewhat different. This is provided with radially extending arms 62, there being three illustrated. Each arm has a depending end section 63 with a perforation 64. Through this perforation extends an axle 65, the axle fitting in the socket 66 in a lower or hub section 67 of the sleeve. Each axle is held in place by means of a cotter pin 68. Each axle has a plurality of notches 69 with marking numerals 70 adjacent thereto, and a collar 71 is provided with a set screw 72, the set screw fitting in any one of the notches and holding the collar clamped in such position. This, therefore, holds the rotary cutters 73 in place. Each cutter is illustrated as having a flat inside face 74, and a beveled face 75 of a considerable width compared to its diameter. I find this construction quite suitable for holes of small diameter which do not require a cutter of the same strength as that of Figs. 1, 2, and 3.

In this case, the manner of operation and functioning of the device is substantially the same as that of the tool of Figs. 1, 2, and 3. The stem 50 is first clamped in place on the tank wall, a punch having been driven through the wall at the center of the hole to be cut. The cutters may then be fed to the work in the manner described in connection with Figs. 1, 2, and 3.

In Fig. 8 I show a modified type of cutter, this having a cutting disk 80, which disk has a narrow cylindrical periphery 81. In this case it is necessary to slightly modify the clamping ring 82 which is made of larger diameter than shown in Fig. 3 and has a series of perforations 83 for a purpose hereinunder detailed. The same circular clamping plate may be used, but the shearing 84 is of greater diameter than the section to be cut of the metal plate 85, such as a tank wall, and in this case the shearing ring is provided with an annular groove 86, the shearing edges 87 of which are spaced apart but slightly greater than the width 81 of the rotary cutter.

In the action of this type of cutter, the edges 87 of the groove act as shearing edges and the cylindrical edge on the cutters presses and forces the metal downwardly so that a ring 88 is cut from the plate and forced into the groove 86, thereby leaving a circular section 89 of the plate attached to the clamp. In this case as the clamping ring is of larger diameter than the hole cut in the tank wall, it is necessary to disassemble this clamping ring from the stem 11 before the device may be removed from the hole. Punches may then be inserted through the perforations 83 in the clamping ring and through perforations 90 in the shearing plate to punch the ring 88 out of the groove 86.

Various changes may be made in the details of construction without departing from the scope of my invention as defined by the appended claims.

I claim:

1. A hole cutting implement for cutting holes in metal plate comprising a circular clamping plate, a circular shearing member, said members having equal diameters and opposed flat faces, means for drawing said members together against opposite sides of a plate to be apertured so as to render the plate clamped between the clamping plate and shearing member substantially flat, cutting means mounted for rotation about the centers of the clamping plate and shearing member adapted to weaken the plate at the edge of the clamping plate, there being provision made for forcing the drawing means longitudinally during cutting so as to cause the clamping plate and shearing member to remove a disk of the plate to be cut by shearing when the plate has been sufficiently weakened by the cutting means.

2. A hole cutting implement for cutting holes in metal plate comprising a circular clamping plate, a circular shearing member, said members having equal diameters and opposed flat faces, means for drawing said members together against opposite sides of a plate to be apertured so as to render the plate clamped between the clamping plate and shearing member substantially flat, cutting means mounted upon the drawing means for rotation about the centers of the clamping plate and shearing member, said cutting means being adapted to weaken the plate to be cut at the edge of the clamping plate, and means for forcing the cutting means against the plate to be cut so that by reaction the drawing means will cause the shearing member to pull the disk of the plate to be cut which is clamped between the clamping ring and shearing member in opposition to the cutting means whereby the disk will be removed by shearing when its edge has been sufficiently weakened by the cutting means.

3. A hole cutting implement for cutting holes in plates comprising a shouldered draw bolt, a clamping plate positioned against the shoulder adapted to be positioned against one side of a plate to be cut, a shearing member on the draw bolt having means for tightening it against the opposite side of the plate, said shearing member and clamping plate being of the same size and presenting opposed flat surfaces so that on tightening the portion of the plate disposed therebetween will be rendered substantially flat, cutting means rotatably mounted upon the draw bolt adapted to cut and weaken the plate at the edge of the clamping plate, and means on the draw bolt for forcing the cutting means against the plate.

4. A hole cutting implement for cutting holes in plates comprising a shouldered draw bolt, a clamping plate positioned against the shoulder adapted to be positioned against one side of a plate to be cut, a shearing member on the draw bolt having means for tightening it against the opposite side of the plate, said shearing member and clamping plate being of the same size and presenting opposed flat surfaces so that on tightening the portion of the plate disposed therebetween will be rendered substantially flat, a cutter head rotatably mounted upon the draw bolt carrying outwardly beveled roller cutters adapted to cut and weaken the metal at the edge of the clamping plate, and means on the draw bolt for forcing the cutter head toward the plate.

5. A hole cutting implement for cutting holes in metal plates comprising a draw bolt, a circular shearing member on the draw bolt adapted to be positioned on the inside of a plate to be cut, said shearing member presenting a flat surface against the plate, means on the draw bolt presenting a flat surface of equal diameter to that of the shearing member adapted to be positioned against the outside of the plate to be cut whereby on tightening the shearing member a disk of the plate to be cut will be rendered substantially flat, cutting means arranged to cut and weaken the edge of the disk, and means for forcing the disk out of the plate when its edges have been sufficiently cut and weakened.

6. The method of cutting holes in curved plates which includes clamping a disk of a curved plate between two surfaces with sufficient force to render the disk flat, cutting and weakening the metal at the edges of the disk and simultaneously forcing the disk out of the plate so as to shear out the disk when its edges have been sufficiently weakened.

CLAUD H. BILLS.